US010282877B2

(12) United States Patent
Bedi et al.

(10) Patent No.: US 10,282,877 B2
(45) Date of Patent: May 7, 2019

(54) GENERATING CONTENT AWARE IMAGE FILL WITH GEOMETRICAL CONSTRAINTS

(71) Applicant: Adobe Inc., San Jose, CA (US)

(72) Inventors: Ajay Bedi, Himachal Pradesh (IN); Sourabh Gupta, Noida (IN); Saurabh Gupta, Noida (IN)

(73) Assignee: ADOBE INC., San Jose, CA (US)

(*) Notice: Subject to any disclaimer, the term of this patent is extended or adjusted under 35 U.S.C. 154(b) by 22 days.

(21) Appl. No.: 15/013,762

(22) Filed: Feb. 2, 2016

(65) Prior Publication Data

US 2017/0221243 A1    Aug. 3, 2017

(51) Int. Cl.
G06T 5/00      (2006.01)
G06T 11/60     (2006.01)
G06F 3/0484    (2013.01)

(52) U.S. Cl.
CPC .......... G06T 11/60 (2013.01); G06F 3/04845 (2013.01); G06T 5/005 (2013.01); G06T 2207/10024 (2013.01)

(58) Field of Classification Search
CPC . G06T 11/60; G06T 11/00; G06T 7/13; G06T 2201/00; G06F 3/04842
See application file for complete search history.

(56) References Cited

U.S. PATENT DOCUMENTS

2011/0103644 A1* 5/2011 Garten .................... G06T 5/005
                                                 382/103
2013/0051685 A1* 2/2013 Shechtman ............. G06T 11/60
                                                 382/218

OTHER PUBLICATIONS

Ralekar, Chetan, Shweta Dhondse, and M. M. Mushrif. "Image reconstruction by modified exemplar based inpainting." Communications and Signal Processing (ICCSP), 2015 International Conference on. IEEE, 2015.*
Ralekar, Chetan, Shweta Dhondse, and M. M. Mushrif. "Image reconstruction by modified exemplar based inpainting." Communications and Signal Processing (ICCSP), 2015. International Conference on. IEEE, 2015. (Year: 2015).*
(Criminisi, Antonio, Patrick Pérez, and Kentaro Toyama. "Region filling and object removal by exemplar-based image inpainting." IEEE Transactions on image processing 13.9 (2004): 1200-1212. ) (Year: 2004).*

* cited by examiner

Primary Examiner — Menatoallah Youssef
(74) Attorney, Agent, or Firm — Keller Jolley Preece

(57) ABSTRACT

The present disclosure is directed towards systems and methods for modifying a digital image. For example, systems and methods described herein involve identifying a target portion of a digital image to remove from the digital image. The systems and methods further involve identifying geometric features intersecting or surrounding the identified target portion. The systems and methods further involve analyzing and identifying a source portion having geometric properties that correspond to the identified geometric features intersecting the target portion. Further, the systems and methods involve removing the target portion and replacing the target portion with the source portion by aligning the geometric properties to blend together with the background surrounding the removed target portion. In this way, the output image includes a replacement portion in place of the removed target portion that blends together with the background of the output image.

20 Claims, 11 Drawing Sheets

GENERATING CONTENT AWARE IMAGE FILL WITH GEOMETRICAL CONSTRAINTS

BACKGROUND

1. Technical Field

One or more embodiments of the present disclosure relate generally to modifying a digital image. More specifically, one or more embodiments disclosed herein relate to systems and methods for modifying a digital image by removing a target portion from the digital image (e.g., an unwanted object in the digital image).

2. Background and Relevant Art

Computing devices (e.g., computers, tablets, smart phones) provide numerous ways for people to capture, create, share, view, and otherwise interact with numerous types of digital content. As such, users are increasingly using computing devices to interact with and modify digital photographs (or simply "digital photos"). For example, many computing devices enable users to enhance a digital photo by cropping or otherwise removing a portion of the digital photo. For instance, a computing device can edit a digital photo by removing an object, a person, or other feature in the digital photo.

In addition to enabling removal of various objects from within digital photos, many conventional systems and methods replace the removed object with a replacement portion. For example, in response to removing an object from a digital photo, conventional systems and methods often replace the removed object with a replacement portion that includes similar features as the portion of the digital photo surrounding the removed object (e.g., using a digital photo fill process). In this way, a user can modify or otherwise edit a photo to remove an undesired object while maintaining continuity in the background of the digital photo. Nonetheless, removing and replacing objects within digital photos has various drawbacks and limitations with conventional systems and methods.

In particular, where digital photos have lines, shapes, or other geometric features in the background of the digital photo, conventional systems and methods often fail to maintain a sense of continuity in the background after removing and replacing a removed object within the digital photo. For example, where a background of a digital photo includes lines that intersect a portion of an object to be removed, conventional systems and methods fail to generate or provide a replacement background that includes lines that align with or otherwise match surrounding portions of the digital photo around the removed object. As a result, replacing a removed object within a digital photo often results in a discontinuous or otherwise erroneous representation of the background. The discontinuous and/or erroneous representation of modified photos that result from conventional systems and methods diminishes the visual quality of the resulting modified digital photo and is frustrating to users.

In addition to failing to correctly account for lines, shapes, or other irregularities in the background of the digital photo, conventional devices also fail to adequately compensate for different surface plans within the digital photo. In particular, where the background of a digital photo includes different planes having different perspectives, conventional systems and methods often fail to provide a replacement background that compensates for the perspective difference of the different planes within the digital photo. As such, replacing an object within a digital photo that includes multiple background planes often includes skewed or distorted portions of the replacement portion and similarly diminishes the quality of the resulting modified digital photo.

Thus, there are a number of considerations to be made in modifying a digital image by removing an object and replacing the object within the digital image.

SUMMARY

One or more embodiments described herein provide benefits and/or solve one or more of the foregoing and other problems in the art with systems and methods that involve modifying a digital image by removing a portion of the digital image and replacing the removed portion with a geometrically adjusted source portion. In particular, one or more embodiments include systems and methods that identify a target portion of an input image for removal from the input image. Upon determining that the input image includes one or more geometric features that intersect or surround the target portion, the systems and methods identify a source portion (or replacement portion) of a digital image (e.g., input image) that includes a geometric property that corresponds to the one or more geometric features that intersect or surround the target portion of the input image. Further, the systems and methods generate an output image by removing the target portion from the input image and replacing the removed portion of the input image with the identified source portion. In one or more embodiments, the systems and methods replace the target portion with the source portion by aligning the geometric property of the source portion with the intersecting geometric feature(s) of the removed portion of the input image.

Accordingly, the systems and methods can prevent discontinuities and other resulting flaws in the background of a modified digital image caused as a result of replacing a target portion of a digital image with replacement content that includes one or more geometric features. For example, upon determining that a digital image includes geometric features that intersect an object to be removed from the input image, the systems and methods can identify a source portion that includes geometric properties that correspond to the geometric features that intersect the object to be removed. The systems and methods can further generate an output image by removing the object and replacing the object with a geometrically adjusted and geometrically aligned source portion having corresponding geometric properties to the geometric features that intersect the removed portion of the input image. As such, the systems and methods provide a modified output image that includes a continuous and clean background portion using a geometrically adjusted and aligned source portion to replace a removed object (or other target portion) from within the input image.

In addition, examples of the systems and methods disclosed herein prevent flaws and distortions caused as a result of varying background planes or perspectives within a digital image. In particular, the systems and methods can identify different background planes within the digital image and account for different angles or perspectives within the digital image caused by the different background planes. For example, where an object to be removed from an input image overlaps multiple background planes, the systems and methods can identify source portions of a digital image (e.g., the input image) to replace each individual portion of the object that corresponds to each of the multiple background planes. Additionally, in one or more embodiments, the systems and methods perform one or more transformations on an identified source portion to have a similar perspective as a background plane of a removed portion of the input image. For instance, the systems and methods can obtain a source portion from a first plane, and then perform one or more transformations to the source portion such that the source portion effectively replaces a target portion on a second plane.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other marketing features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which.

DETAILED DESCRIPTION

Figure 1A:
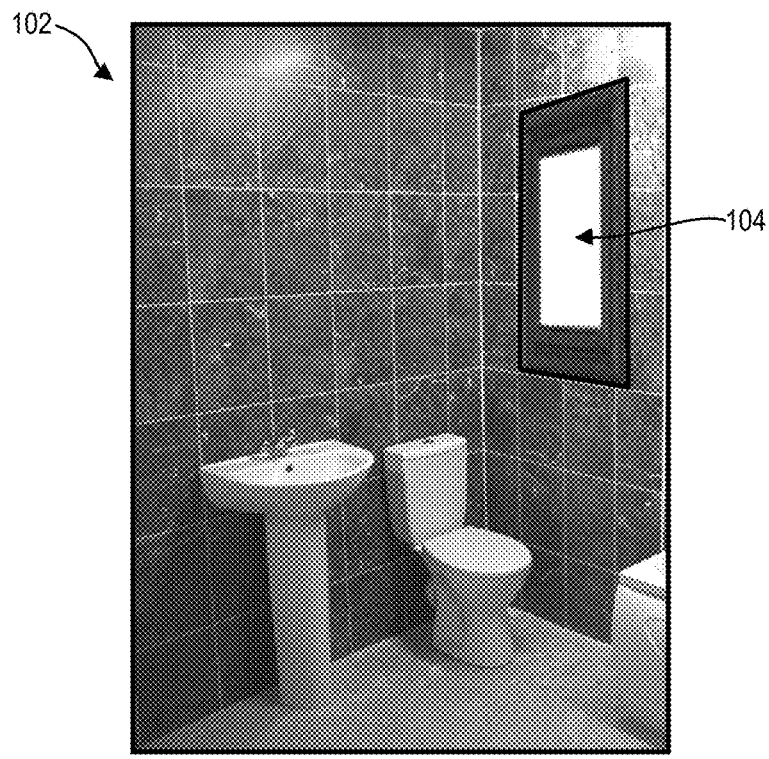
FIG. 1A illustrates an example digital image including an object to be removed in accordance with one or more embodiments.

The present disclosure describes one or more embodiments of an image modification system (or simply "system") that modifies digital images by removing objects from within digital images. In particular, the system modifies digital images by removing a portion of the digital image targeted for replacement, and then replacing the removed portion of the digital image with a replacement portion. For example, the system can identify a target portion to be removed from an input image (e.g., based on a user selection). Additionally, the system determines that the input image includes at least one intersecting geometric feature that intersects with the target portion to be removed from the input image. The system further identifies a source portion that includes a geometric property corresponding to the at least one intersecting geometric feature. For example, the system can identify a portion of the input image having geometric properties similar to the intersecting geometric features. Alternatively, the system can identify a source portion from one or more images other than the input image, as will be explained in further detail below. Additionally, the system generates an output image by removing the target portion from the input image and replacing the removed portion with the source portion by geometrically aligning the geometric property of the source portion with the at least one intersecting geometric feature.

By identifying a source portion of a digital image that includes geometric properties that correspond to geometric features that intersect a target portion, and by using the source portion to replace the target portion, the system can replace a target portion of an input image with a replacement background that seamlessly blends with surrounding background portions of the input image. For example, where an input image includes lines or other geometric features that intersect or otherwise surround an object to be removed from the input image, the system can select a source portion that includes geometric properties to blend with the background of the input image surrounding the object to be removed. For example, the system can identify a portion within the input image or other image that includes similar geometric properties as the geometric features intersecting the object, as will be explained in further detail below. Additionally, the system can align the source portion to match or otherwise blend the geometric properties of the source portion with one or more geometric features intersecting the object to be removed. In this way, the system can produce an output image that includes a replacement background portion including lines, shapes, patterns, or other geometric features that seamlessly blend together with lines, shapes, patterns, or other geometric features that intersect the removed portion of the input image.

Additionally, the system can compensate for perspective differences between a target portion and a source portion by transforming the source portion to correspond or otherwise match the perspective of the target portion. In particular, the system can determine that a source portion has a first perspective (e.g., lies on a first plane) and that the target portion has a second perspective (e.g., lies on a second plane). In response, the system can apply a transformation to the source portion that transforms the first perspective of the source portion to match the second perspective of the target portion.

For example, upon removing a target portion that lies on a first background plane of an input image, the system can identify a source portion of the input image that lies on a second background plane. The system then transforms the source portion so that the geometric properties of the source portion are adjusted to have the same or similar perspective as the first background plane. After transforming the source portion, the system can replace the target portion with the transformed source portion with the transformed source portion including lines, shapes, and other features that not only align with geometric features of the first background plane, but also match the perspective of the geometric features of the first background plane. As such, the system can produce an output image without distortion caused as a result of different background perspectives.

In addition to compensating for different background planes between a source portion and a target portion, the system can similarly compensate for different sections of a target portion that overlap multiple different background planes. For example, an object that a user wants to remove from an input image may overlap multiple background planes. In such a case, the system can identify a plurality of individual target sections of the object that correspond to each of the multiple background planes. Similarly, the system can identify a plurality of different source portions that correspond to each of the multiple background planes. Therefore, the system replaces each of the plurality of target portions with one portion from the plurality of source portions that corresponds to the background of a particular target portion.

As an example, a digital image may include an object positioned within a corner of a room having two intersecting walls as background behind the object in the digital image. In other words, the background behind the object includes a first wall on a first plane and a second wall on a second plane. In this example, the system identifies a first portion of the object that is in front of the first wall, and additionally, the system identifies a second portion of the object that is in front of the second wall. Moreover, in one or more embodiments, the system identifies a first source portion that matches the first wall to replace the first portion of the object. Likewise, the system identifies a second source portion that matches the second wall to replace the second portion of the object. As a result of performing individual replacement of different sections of the object, the system can generate a modified output image with a high quality representation of different backgrounds having different perspectives that each overlap the removed portion of the input image.

As used herein, the terms "target portion" or "target area" are used interchangeably to refer to a portion or area of a digital image targeted for modification. For example, a target portion can refer to an area of a digital image including an object or other foreground content therein. Alternatively, a target portion can refer to any defined portion of a digital image that has been targeted for removal from the digital image. In one or more embodiments, the target portion includes a user-defined area targeted for replacement. Alternatively, in one or more embodiments, the system identifies a target portion as any pixels that make up a particular object within the digital image.

As used herein, the term "source portion" refers to a portion of a digital image including content to be used for replacing a target portion. The source portion can refer to any portion of a digital image. For example, the source portion can include background content used to replace a removed portion of the digital image. In one or more embodiments, the source portion originates from the same digital image as the target portion. Alternatively, the source portion can come from a different digital image that includes a similar background and/or other similar features as the digital image including the target portion. For example, the system may identify that one more additional images having background characteristics that are similar to the background characteristics of an input image, and as such, may select one or more source portions from the one or more additional images.

As used herein, the terms "geometric feature" or "geometric property" refer to a particular feature or geometric characteristic within a digital image. For example, a geometric feature or geometric property can include, but is not limited to, a line, shape, pattern, or other characteristic within the content of a digital image. In one or more embodiments, geometric features or geometric properties refer to features or characteristics in a background portion of a digital image. For example, where a background includes horizontal and vertical lines, a geometric feature may refer to an individual horizontal line, an individual vertical line, or a combination of multiple horizontal and/or vertical lines.

As used herein, a "background plane" refers to any portion or multiple portions of a digital image having a particular perspective. In particular, a background plane may refer to a continuous two-dimensional surface having a uniform perspective across a portion of the digital image. To illustrate, where a digital image includes a background having a first and second wall that intersect at a corner, a first background plane can refer to a surface of the first wall and a second background plane can refer to a surface of the second wall. As another example, where a digital image includes a background having a sky over a building, a first background plane can refer to the portion of the digital image including the sky while one or more additional background planes can refer to different surfaces of the building (e.g., ceilings, walls) each having a different planar perspective. To further illustrate, where a digital image includes a staircase, each surface of the staircase is a different background plane within the digital image.

Additional features and characteristics of one or more embodiments of the image modification system are described below with respect to the Figures. In particular, FIGS. 1A-1C will be referred to while providing an overview of various features and functionality of the image modification system. Additional details and particular embodiments will be discussed with reference to FIGS. 2A-4B.

Figure 1B:
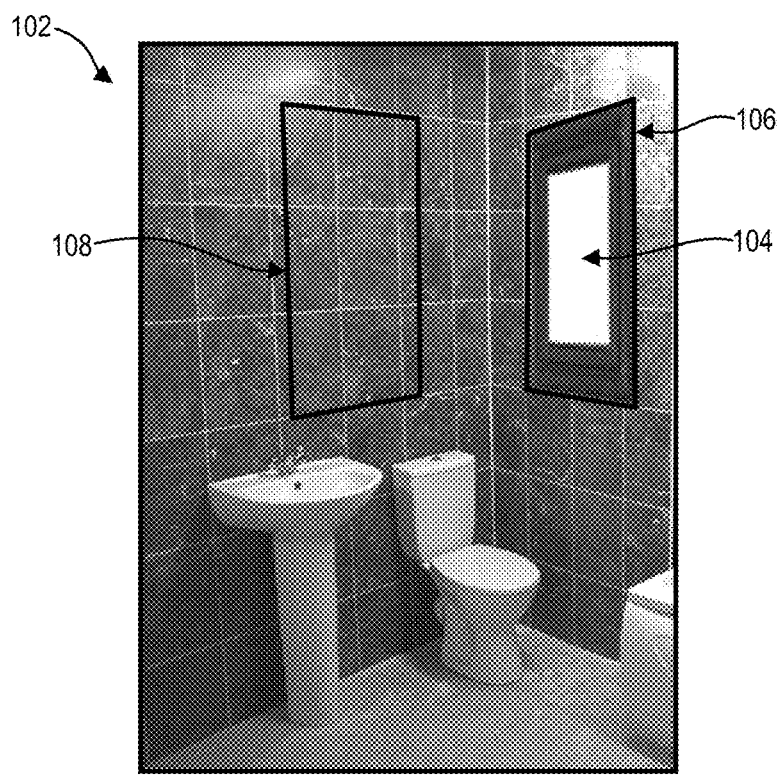
FIG. 1B illustrates an example digital image including the object to be removed and an identified source portion in accordance with one or more embodiments.
Figure 1C:
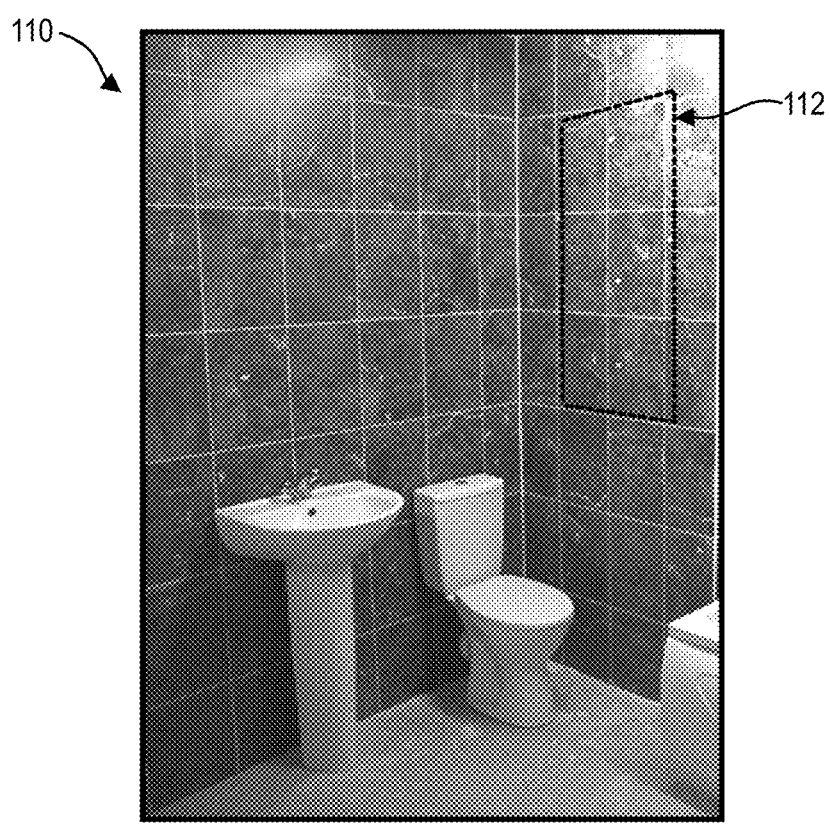
FIG. 1C illustrates an example modified digital image including modifications applied to the digital image of FIG. 1A in accordance with one or more embodiments.

In accordance with one or more embodiments, FIGS. 1A-1C illustrate an example input image 102, shown in FIG. 1A, and a resulting output image 110 that has been modified by removing a target portion of the input image 102 and filling the removed target portion to blend with the background of the output image 110, shown in FIG. 1C. In particular, as will be described in greater detail below, the image modification system can remove a target portion 106 of the input image 102 including the mirror 104, shown in FIG. 1B. Further, the image modification system can identify a source portion 108 and generate an output image including a replacement portion 112 based on content included within the source portion 108.

As mentioned above, the image modification system can modify the input image 102 by identifying a target portion 106 to be removed from the input image 102. In one or more embodiments, the image modification system identifies the target portion 106 based on a user selection of an object. For example, the user can select the mirror 104 by clicking or otherwise interacting with the mirror 104 displayed on a graphical user interface. In response to receiving the selection of the mirror 104, the image modification system can define the target portion 106 as any portion of the input image 102 including the mirror 104 or otherwise define an area surrounding the mirror 104. In one or more embodiments, the image modification system identifies the target portion 106 based on a single user interaction (e.g., a user selection of the mirror 104).

Alternatively, in one or more embodiments, the image modification system identifies the target portion 106 to be removed from the input image 102 based on a user input defining the boundaries of the target portion 106. For example, a user can interact with a graphical user interface by drawing a boundary around the mirror 104 to define the target portion 106. In addition, or as an alternative to defining the target portion 106 around the mirror 104, the user can define any number of areas within the input image 102 as target portions to be removed from the input image 102 and replaced with one or multiple replacement portions. For example, with regard to FIGS. 1A-1C, it is appreciated that the user can identify portions of the input image 102 corresponding to other objects (e.g., the toilet, sink, or bathtub) to be removed from the input image 102 and targeted for replacement within the output image 110.

As briefly mentioned above, the image modification system can identify one or more geometric features within the input image 102. For example, as shown in FIGS. 1A-1C, the walls of the bathroom includes horizontal and vertical lines that define tiles used to construct the walls of the bathroom. As such, for example, the input modification system can identify each of the horizontal and vertical lines on the walls of the bathroom in addition to lines separating the two different walls and the floor of the bathroom.

In addition to identifying lines and other features throughout the input image 102, the image modification system also identifies geometric features that intersect with or surround the target portion 106. For example, as shown in FIG. 1C, the image modification system can identify the horizontal and vertical lines on the wall of the bathroom that includes the target portion 106. Additionally, the image modification system can identify any number of geometric features in the area surrounding the target portion 106 that may not intersect directly with the object and/or target portion 106.

Based on the geometric features surrounding and/or intersecting the target portion 106, the image modification system can further identify a source portion that includes corresponding geometric properties that correspond with the geometric features that intersect and/or surround the target portion 106. For example, as shown in FIG. 1B, the image modification system identifies a source portion 108 including a portion of the wall on the left side of the input image 102 that includes similar horizontal and vertical lines as the horizontal and vertical lines intersecting the target portion 106. In particular, based on an analysis of the lines intersecting and otherwise surrounding the target portion 106, the image modification system can identify a source portion 108 that includes horizontal and vertical lines that are similar to vertical and horizontal lines that run behind and/or surround the mirror 104.

As will be described in greater detail below, the image modification system can perform an analysis of the input image 102 including geometric features within the input image 102 to determine the source portion 108 that is most likely to include similar geometric properties as the geometric features intersecting the target portion 106. For example, in one or more embodiments, the image modification system performs a probability algorithm on individual pixels or neighborhoods of pixels within the input image 102 to identify lines having a particular threshold probability of matching one or more lines that intersect the target portion 106. Using the results of the probability algorithm, the image modification system can identify specific pixels or neighborhoods of pixels including lines or other geometric properties that may be used to replace the target portion 106. Based on the results of the probability algorithm, the image modification system can identify the source portion 108 to replace the removed target portion 106 in generating the output image 110.

Upon identifying the source portion 108, the image modification system generates the output image 110. As shown in FIG. 1C, the output image 110 includes a replacement portion 112 that replaces the target portion 106 with the source portion 108. In one or more embodiments, the image modification system generates the replacement portion 112 by aligning the geometric property of the source portion 108 with the corresponding geometric features intersecting the target portion 106. For example, the image modification system can crop, rotate, expand, stretch, compress, duplicate, or otherwise cause the geometric properties of the source portion 108 to align with the geometric features intersecting the target portion 106. For example, and as shown in FIGS. 1A-1C, the image modification system can align the vertical and horizontal lines running through the source portion 108 to align with vertical and horizontal lines that intersect the target portion. Additionally, in one or more embodiments, the image modification system can further align the vertical and horizontal lines of the source portion 108 to match or otherwise blend together with one or more lines that surround the target portion without passing through or intersecting the target portion 106.

In addition to aligning the geometric properties of the source portion 108 with the geometric features of the area surrounding the target portion 104 in generating the replacement portion 112, the image modification system further may transform the source portion 108 to match a perspective of the target portion 104. For example, as shown in FIGS. 1A-1C, the source portion 108 is located on a left wall within the input image 102, while the target portion 106 is on a right wall within the input image 102. It is noted that each of the left wall and the right wall have different planar perspectives. As will be described in greater detail below with regard to FIGS. 2A-2D, based on the different planar perspectives of the left wall and the right wall, the image modification system transforms the source portion 108 by calculating a projection matrix that enables transformation of the perspective of the source portion 108 to match or otherwise align with the perspective of the target portion 106.

In one or more embodiments, the image modification system can generate the replacement portion 112 using content from within the input image 102 as the source portion 108. For example, as shown in FIGS. 1A-1C, the image modification system generates the replacement portion 112 using content from the source portion 108 within the same input image 102 as the target portion 106. Alternatively, in one or more embodiments, the image modification system generates the replacement portion 112 using a source portion from a different digital image than the input image 102. For example, where the input image 102 is part of a collection of burst images, images taken in sequence, or digital images having similar backgrounds as the input image 102, the image modification system can analyze multiple images to define a source portion that provides the best content for replacing the target portion 106.

Thus, based on the above overview, the image modification system can remove a target portion 106 including the mirror 104 from within the input image 102 of FIG. 1A and generate the output image 110 of FIG. 1C including the replacement portion 112 that blends into the background surrounding the removed target portion 106. In particular, as described above, the image modification system can identify a source portion 108 having geometric properties that correspond to the geometric features intersecting the target portion 106. Additionally, to compensate for different planar perspectives of the source portion 108 and the target portion 106, the image modification system can generate the replacement portion 112 by cropping, shifting, compressing, expanding, transforming, or otherwise manipulating the source portion 108 such that the replacement portion 112 seamlessly blends into the background of the removed target portion 106, as shown in FIG. 1C.

Figure 2A:
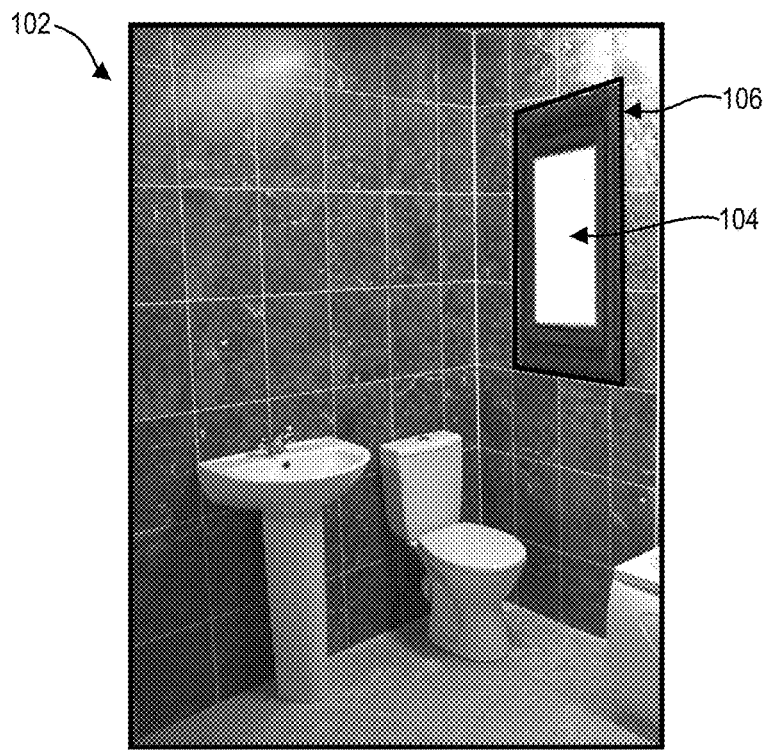
FIG. 2A illustrates an example digital image including an object to be removed in accordance with one or more embodiments.
Figure 2B:
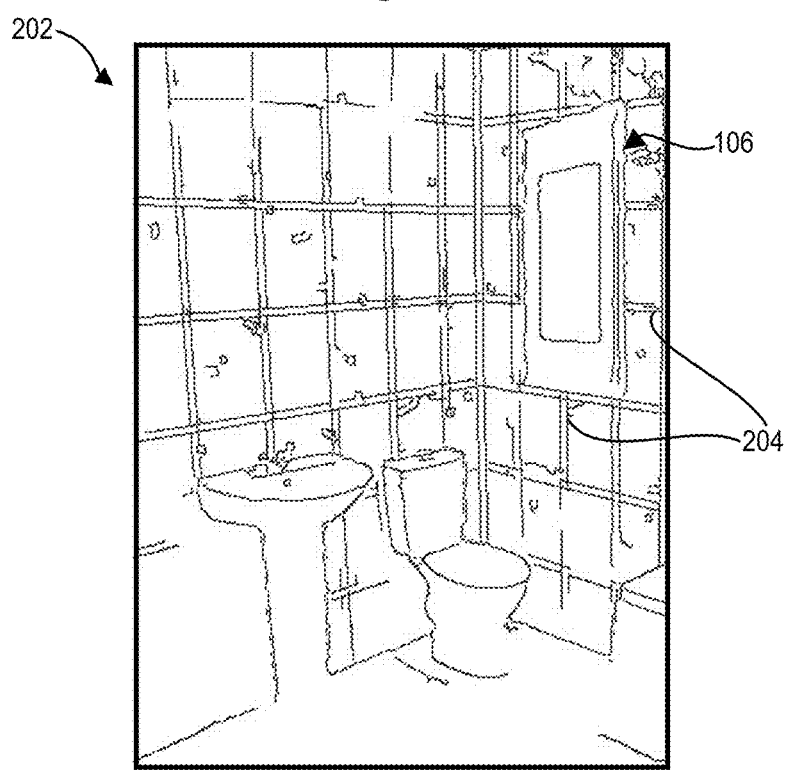
FIG. 2B illustrates an example edge map of the example digital image of FIG. 2A in accordance with one or more embodiments.
Figure 2C:
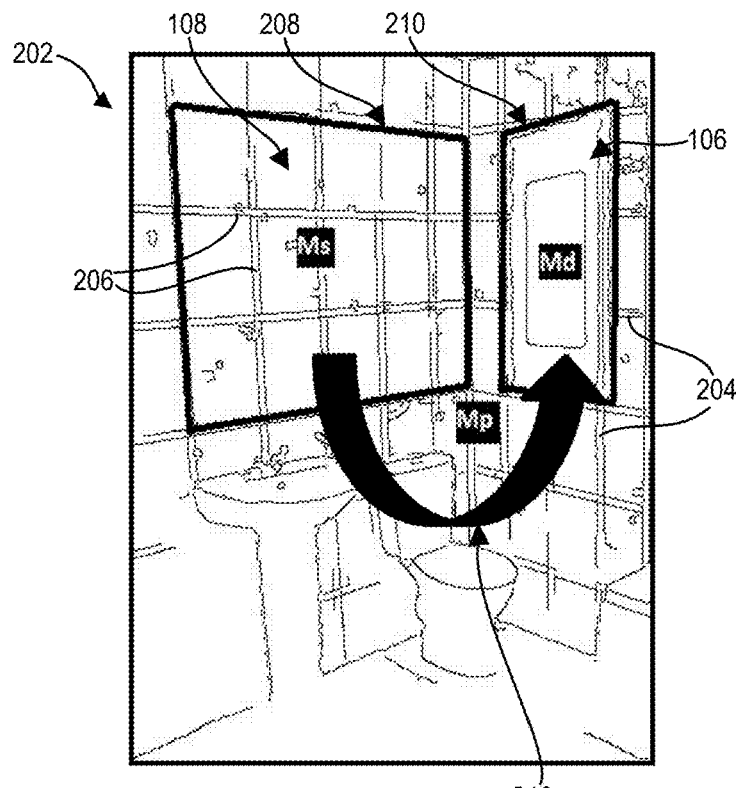
FIG. 2C illustrates the example edge map of FIG. 2B including a portion to be removed and an identified source portion in accordance with one or more embodiments.
Figure 2D:
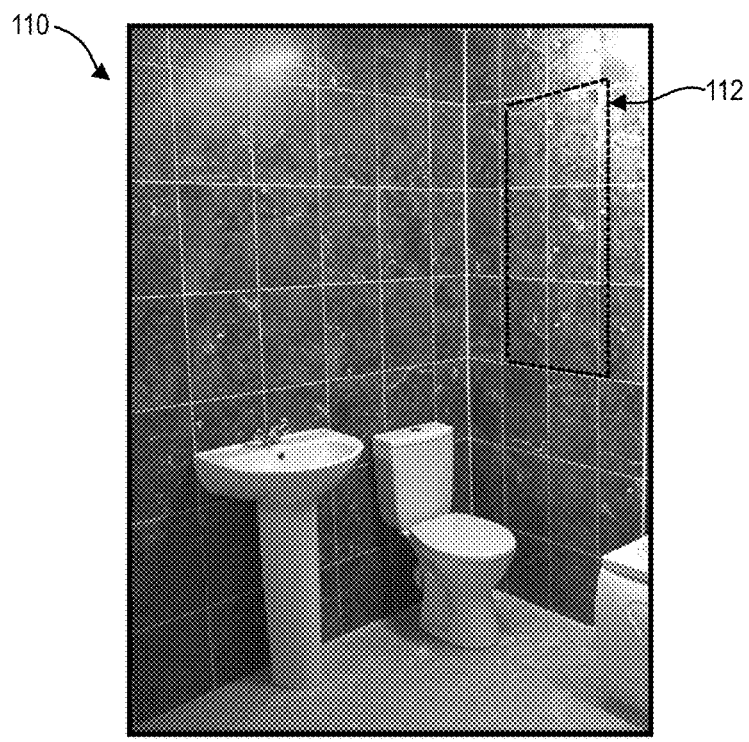
FIG. 2D illustrates an example modified digital image including modifications applied to the digital image of FIG. 2A in accordance with one or more embodiments.

FIGS. 2A-2D illustrate additional details with respect to one or more example embodiments of an image modification system. For example, similar to FIG. 1A, FIG. 2A illustrates an example input image 102 including an object 104 defined by the target portion 106. Further, similar to FIG. 1C, FIG. 2D illustrates an example output image 110 including a replacement portion 112 in place of the target portion 106 from FIG. 2A. Accordingly, and as described above with respect to FIGS. 1A-1C, FIGS. 2A-2D illustrates that upon identifying a target portion 106 to be removed from the input image 102, the image modification system identifies one or more geometric features that intersect the target portion 106. In addition, the image modification system identifies a source portion 108 having geometric properties that correspond to the one or more geometric features that intersect the target portion 106.

In one or more embodiments, identifying the geometric features within the input image 102 involves generating an edge map. For example, FIG. 2B illustrates an edge map 202 including a black and white representation of the input image 102 of FIG. 2A. In one or more embodiments, the image modification system generates the edge map 202 using an edge detection algorithm to detect any number of edges within the input image 102. For example, the image modification system can perform a Canny edge detection algorithm by detecting gradient values within the input image 102. Based on pixel gradient values or intensity gradients within the image, the image modification system identifies edges within the input image 102, and the image modification system uses the identified edges to generate the edge map 202.

In addition to detecting gradients and determining various gradient values, the image modification system can apply one or more filters to the input image. For example, in one or more embodiments, as preparation for determining gradient values and eliminating noise within the input image 102, the image modification system applies a Gaussian filter to smooth the input image 102 and remove potential noise.

Additionally or alternatively, after detecting one or more gradients, the image modification system can apply a suppression filter to get rid of one or more spurious responses (e.g., false edges) to detecting the different gradients. In one or more embodiments, the image modification system performs adaptive hysteresis localization and thresholding so that noise in the input image 102 does not create false edges. Using the adaptive hysteresis localization and other filtering techniques, the image modification system can generate the edge map 202 that provides an accurate representation of edges that appear within the input image 102.

Upon detecting edges within the input image 102, the image modification system generates the edge map 202 including a black and white representation of portions within the input image 102 that identify edges and non-edges within the input image 102. For example, and as illustrated in FIG. 2B, based on the detected gradients and determined edge values, the image modification system generates the edge map 202 by modeling the input image 102 using a black pixel value (e.g., 0 pixel value) to indicate a pixel that is part of an edge and a white pixel value (e.g., 1 pixel value) to indicate a pixel that is not part of an edge. Alternatively, the edge map 202 can include a reverse of black and white pixel values or other combination of pixel values that may be used to distinguish between edges and non-edges within the input image 102.

As mentioned above, the image modification system identifies geometric features within the input image 102. In one or more embodiments, the image modification system identifies geometric features within the input image 102 by identifying characteristics of detected lines within the edge map 202. In particular, in one or more embodiments, the image modification system identifies line segments exceeding a particular threshold length, thickness, or other metric indicating that an identified line segment is a geometric feature within the edge map 202. For example, if a line segment exceeds a threshold length, the image modification system can determine that the line segment is part of a vertical line, horizontal line, or other geometric feature within the input image 102.

In one or more embodiments, the image modification system identifies geometric features and properties within the edge map 202 by performing a transformation algorithm. For example, in one or more embodiments, the image modification system performs a Probabilistic Hough transformation on the edge map 202 to detect lines within the edge map 202. In particular, in one or more embodiments the image modification system uses an accumulator to detect the existence of a line within the edge map 202. For example, the image modification system uses an accumulator including a two-dimensional array that detects the existence of a line described using the following equation at pixel location x,y having quantized values r and θ.

$$r = x\cos(\theta) + y\sin(\theta)$$

As an alternative to the Probabilistic Hough transformation, one or more embodiments of the image modification system can detect lines by performing a Hough transformation. Nevertheless, using the Probabilistic Hough transformation can avoid conducting at least a portion of a more computationally expensive voting process for non-zero pixels in the image by considering geometric properties of analytical curves and reducing overall computing requirements of the image modification system. Additionally, the Probabilistic Hough transformation can yield fewer line segments with higher accuracy than performing a generic Hough transformation.

Upon analyzing the edge map 202 and detecting edges (e.g., geometric features) throughout the input image 102, the image modification system can identify geometric features that intersect the target portion 106 of the input image 102. For example, as shown in FIG. 2B, the edge map 202 indicates lines 204 that pass through or surround the target portion 106. Alternatively, in one or more embodiments, the geometric features can include shapes, texture, or patterns of various features that intersect or surround the target portion 106.

In addition to identifying geometric features that intersect or surround the target portion 106, the image modification system can evaluate the detected lines within the edge map 202 to identify portions of the input image 102 that may be useful in replacing the removed target portion 106. For example, the image modification system can search an accumulator for all lines given a certain threshold value. In particular, the image modification system can identify a probability that a particular line will be useful in replacing the target portion 106 in order to identify a source portion 108.

As mentioned above, the image modification system can search an accumulator for all identified lines that have a certain probability threshold indicating that a particular line would be useful in replacing a removed target portion 106. For example, in one or more embodiments, the image modification system can use the probabilistic Hough transformation algorithm to determine if there is enough evidence of a straight line at a particular pixel at pixel location x,y. If so, the image modification system can calculate the parameters r and θ of the line and look for a bin of the accumulator that the parameters fall into, and increment the value of the bin. For example, as shown in FIG. 2C, the image modification system uses the probability transformation to identify the source portion 108 including source content for replacing the target portion 106. In particular, as shown in FIG. 2C, the image modification system can identify geometric properties 206 including pixels within the edge map 202 that are part of one or more lines that meet a threshold probability that the line(s) will be useful in replacing the target portion 106 of the input image 102. In particular, the image modification system identifies the geometric properties 206 that have a high likelihood to align with and blend with corresponding geometric features 204 that intersect the target portion 106.

As shown in FIG. 2C, the image modification system can identify the source portion 108 using the edge map 202 of the input image 102 that includes the identified target portion 106. Alternatively, as mentioned above, the image modification system can identify the source portion 108 from a different digital image other than the input image 102. Additionally, it is appreciated that the image modification system can generate an edge map for any number of digital images, and accordingly use the generated edge maps for the additional digital images to identify and select a source portion having geometric properties that correspond to the geometric features intersecting or surrounding the target portion 106.

Upon identifying a source portion 108, the image modification system can perform one or more modifications to the source portion 108 to generate the replacement portion 112 that replaces the removed target portion 106. For example, as described above, in one or more embodiments, the image modification system aligns the geometric properties within the identified source portion 108 with identified geometric features that intersect the target portion 108. Additionally, the image modification system can crop, rotate, expand, compress or otherwise modify the source portion 108 and cause some or all of the source portion 108 to align with the geometric features intersecting the target portion 106. For example, as shown in FIG. 2C, the image modification system can copy some or all of the source portion 108 and align the lines 206 of the source portion 108 with corresponding lines 204 that intersect the target portion 106. In this way, the source portion 108 used for generating the replacement portion 112 can blend into the background of the output image 110.

Additionally, as shown in FIG. 2C, the source portion 108 may lie on a different background plane as the target portion 106. As a result, simply copying the source portion 108 and pasting the copied source portion 108 to the target portion 106 without further modification may result in a skewed perspective of the replacement portion 112 and fail to blend into the background of the output image 110 or properly align geometric features that intersect the target portion 106. In order to compensate for the perspective of different background planes, the image modification system can transform the source portion 108 used for replacing the target portion 106 such that the replacement portion 112 matches the background of the output image 110 surrounding the removed target portion 108.

In one or more embodiments, the image modification system corrects or otherwise transforms the perspective of the source portion 108 by calculating a projection matrix 212 to transform the source portion 108 to match a perspective the background area surrounding the target portion 106. For example, as shown in FIG. 2C, the image modification system can generate a source matrix 208 and a destination matrix 210 that include corner values for each of the areas that make up the source portion 108 and the target portion 106. Using the source matrix 208 and the destination matrix 210, the image modification system can calculate a projection matrix 212.

Upon calculating the projection matrix 212, the image modification system can use the projection matrix 212 to modify the perspective of the source portion 108. In particular, the image modification system can generate the replacement portion 112 having a similar perspective as the target portion 106 by transforming the source portion 108 using the projection matrix 212. For example, in one or more embodiments, the image modification system can multiply the source portion 108 by the projection matrix 212 to transform the perspective of the source portion 108 to have a similar perspective as the target portion 106, thus enabling the generated replacement portion 112 to more seamlessly blend with the background of the output image 110.

While the image modification system can transform or otherwise modify the source portion 108 to match the perspective of the background plane of the target portion 106, the image modification system may nonetheless prioritize selection of the source portion 108 based on a perspective of the source portion 108 with regard to the target portion 106 as well as whether the source portion 108 is contained within the same input image 102 as the target portion 106. For example, in one or more embodiments, the image modification system first analyzes portions of the input image 102 or edge map 202 lying on the same background plane as the target portion 106. If the same input image 102 does not include a source portion 108 within the same background plane, the image modification system can next analyze other portions of the input image 102 or edge map 202 to identify the source portion 108 from a different plane as the target portion 106. Additionally, in the case that input image 102 does not include any workable content (e.g., content having geometric properties that satisfy a particular probability threshold) for replacing the target portion 106, the image modification system next analyzes other digital images having similar background portions as the input image 102 to identify a workable source portion for generating the replacement portion 112.

FIGS. 1A-2D illustrate an example embodiment in which the entire target portion 106 lies within a single background plane of the input image. Alternatively, in one or more embodiments, the image modification system uses similar principles and features as described above to remove and replace a target portion that overlaps multiple background planes within a digital image. For example, as described below in connection with FIGS. 3A-3C, the image modification system can remove a target portion from an input image that overlaps multiple background planes to generate an output image with a replacement portion that accounts for the different background planes. In particular, as will be described in greater detail below, the image modification system can remove and replace individual sections of the target portion using a similar process as described above for each identified background plane.

Figure 3A:
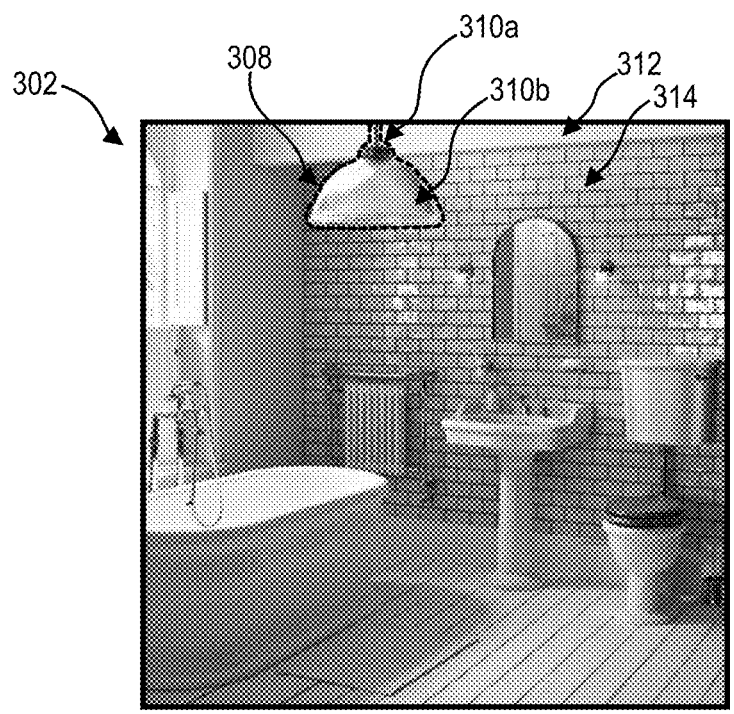
FIG. 3A illustrates an example digital image including an object to be removed in accordance with one or more embodiments.

For example, FIG. 3A illustrates an example input image 302 including a digital photo of a light fixture 308 to be removed from the input image 302. Further, as shown in FIG. 3A, the light fixture 308 is enclosed within defined target sections 310*a-b* that overlaps multiple background planes 312, 314 within the input image 102. In particular, as shown in FIG. 3A, a top target section 310*a* of the target portion overlaps a first background plane 312 and a bottom target section 310*b* of the target portion overlaps a second background plane 314.

In one or more embodiments, the image modification system analyzes the input image 302 to identify different background planes 312, 314 within the input image 302. For example, the image modification system can perform one or more algorithms or other analysis of the input image 302 to identify different background planes within the image. As an example, the image modification system can randomly sample pixels or regions of pixels throughout the input image 302 and identify respective background planes. As another example, the image modification system can identify abrupt or sudden changes in an orientation of a particular pattern (e.g., lines, shapes) and identify different background planes corresponding to the orientation of the particular pattern. For instance, where two walls having a similar tile pattern meet at a corner, the image modification system can detect a difference in angles of the similar tile pattern and identify the different background regions corresponding to the two walls. In one or more embodiments, the image modification system further calculates relative perspective values between different background regions.

Additionally, as mentioned above, FIG. 3A illustrates a first background plane 312 and a second background plane 314. In one or more embodiments, the image modification system identifies the first background plane 312 and the second background plane 314 by analyzing features and properties of the input image 302. For example, the image modification system can analyze the input image 302 and identify an absence of vertical and horizontal lines in a region corresponding to the first background plane 312. Additionally, the image modification system can analyze the input image 302 and identify the horizontal and vertical lines of the brick wall in the region corresponding to the second background plane 314. Based on the different patterns (or lack of pattern) between two regions of the input image 302, the image modification system can identify the respective background planes 312, 314.

The image modification system can also determine that the target portion includes multiple target sections 310*a-b* (e.g., planar portions) that overlap respective background planes 312, 314. For example, the image modification system can identify that the target portion includes a first planar portion 310*a* that overlaps or otherwise corresponds to the first background plane 312 of the input image 102. Additionally, the image modification system can identify that the target portion includes a second planar portion 310*b* that overlaps or otherwise corresponds to the second background plane 314 of the input image 102.

Figure 3B:
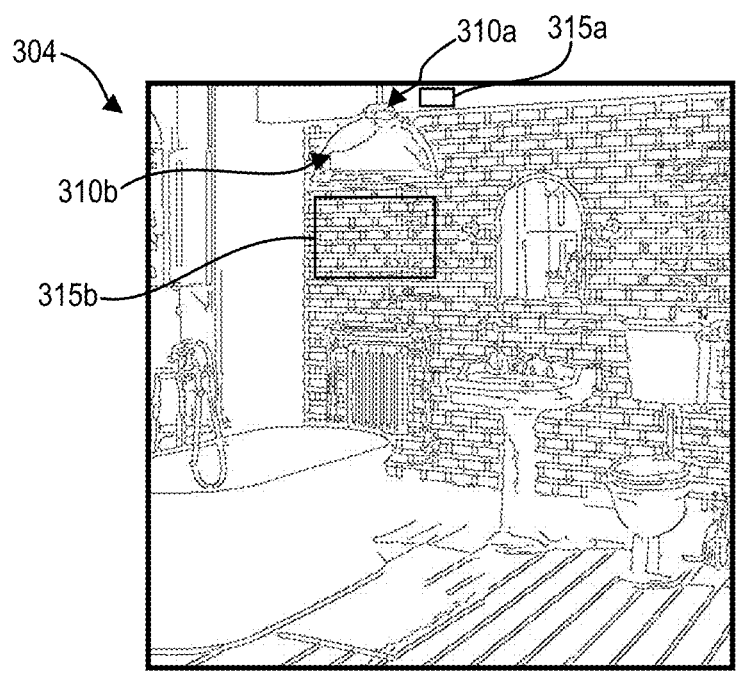
FIG. 3B illustrates an example edge map of the example digital image of FIG. 3A in accordance with one or more embodiments.
Figure 3C:
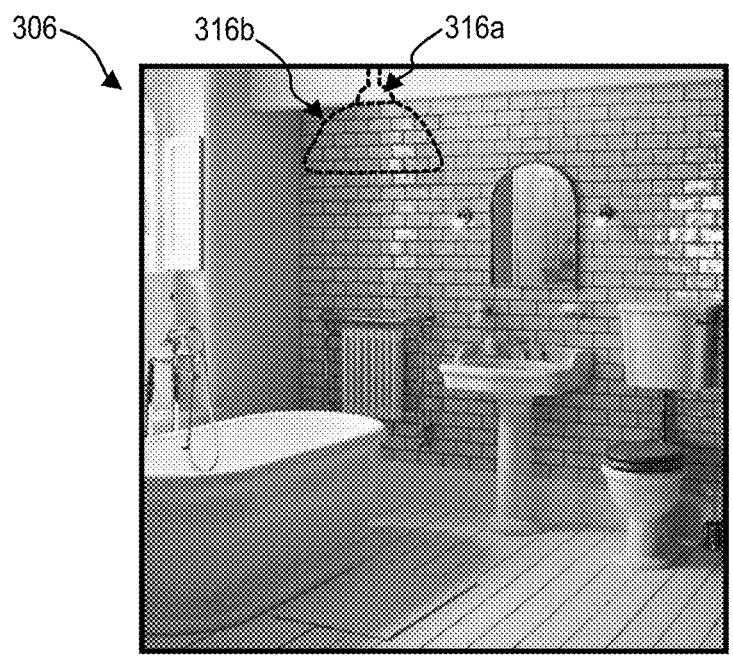
FIG. 3C illustrates an example modified digital image including modifications applied to the digital image of FIG. 3A in accordance with one or more embodiments.

Additionally, as shown in FIG. 3B, the image modification system can generate an edge map 304 including a black and white representation of the input 302. The edge map 304 can include similar features as the edge map 202 described above in connection with FIG. 2B. In one or more embodiments, the image modification system identifies the different background planes 312, 314 and/or target sections 310*a-b* within the background planes 312, 314 using the black and white representation of the edge map 304. For example, using similar methods and algorithms to identify different background planes of the input image 302 described above, the image modification system can identify and distinguish between different background planes 312, 314 by analyzing pixels, patterns, or other features of the edge map 304 to identify different background planes and respective target sections 310*a-b* corresponding to different background planes.

The image modification system can also determine that the input image 102 includes one or more geometric features that intersect with one or both of the different target sections 310*a-b*. For example, as shown in the edge map 304, the bricks of the wall include multiple lines that pass through the bottom target section 310*b* that overlaps the second background plane 314. As such, the image modification system can determine that the bottom target section 310*b* includes geometric lines that intersect the bottom target section 310*b* and presumably continue behind the light 308. Additionally, the image modification system can determine that the same geometric lines of the brick wall do not intersect the top target section 310*a* corresponding to the first background plane 312.

In addition to the lines of the brick wall, the image modification system can further determine that a boundary line between the first background portion 312 and the second background portion 314 passes through one or both of the different target sections 310*a-b*. In particular, the image modification system can determine that the boundary line between different background planes constitutes a geometric feature that intersects one or both target sections 310*a-b*. As such, even though first background plane 312 does not include geometric features similar to the lines of the brick wall, the boundary (or at least a portion of the boundary) between the background planes 312, 314 can pass through the top target section 310*a* of the input image 302.

As mentioned above, the image modification system individually removes and replaces each target section 310*a-b* that overlaps respective background planes 312, 314 within the input image 302. In removing and replacing each target section 310*a-b*, the image modification system identifies different source portions 315*a-b* for replacing respective target sections 310*a-b*. For example, as shown in the illustrated edge map 304 of FIG. 3B, the image modification system can identify respective source portions 315a-b from the content of the edge map 304 for replacing respective target sections 310a-b.

In particular, with respect to the top target section 310a, the image modification system can remove the top target section 310a overlapping the first background plane 312 and identify a corresponding first source portion 315a to replace the removed top target section 310a. As shown in FIG. 3B, the image modification system can use a first source portion 315a from the first background plane 312 to replace the removed top target section 310a. Alternatively, the image modification system can identify and utilize source content from within the input image 302 or other similar digital image and transform or otherwise modify the source portion to match a perspective and align with the surrounding background of the removed top target section 310a.

Additionally, with respect to the top target section 310a, the image modification system can remove the bottom target section 310b corresponding to the second background plane 314 and identify a corresponding second source portion 315b to replace the removed bottom target section 310b. As shown in FIG. 3B, the image modification system can identify and use a second source portion 315b from the second background plane 314 to replace the removed bottom target section 310b. Alternatively, in one or more embodiments, the image modification system identifies a source portion from a different background plane and transforms or otherwise modifies the source portion to match a perspective and align with the surrounding background of the removed bottom target section 310b.

Thus, the image modification system can generate the output image 306 including respective replacement portions 316a-b by identifying source portions 315a-b and individually replacing each target section 310a-b of the input image 302. Replacing each target section 310a-b can include similar steps and features as replacing the entire target portion 106 as described above in connection with FIGS. 1A-2D. Additionally, in one or more embodiments, the image modification system can replace a portion of the input image targeted for replacement by dividing up a target portion into any number of sections and replacing each of the sections individually.

Figure 4A:
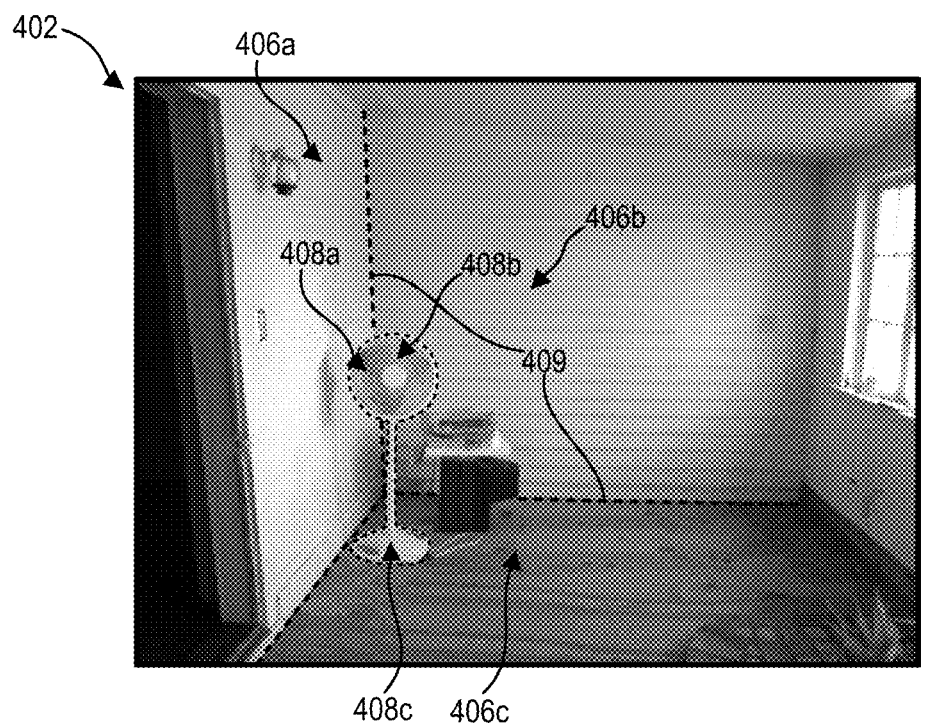
FIG. 4A illustrates an example digital image including an object to be removed in accordance with one or more embodiments.
Figure 4B:
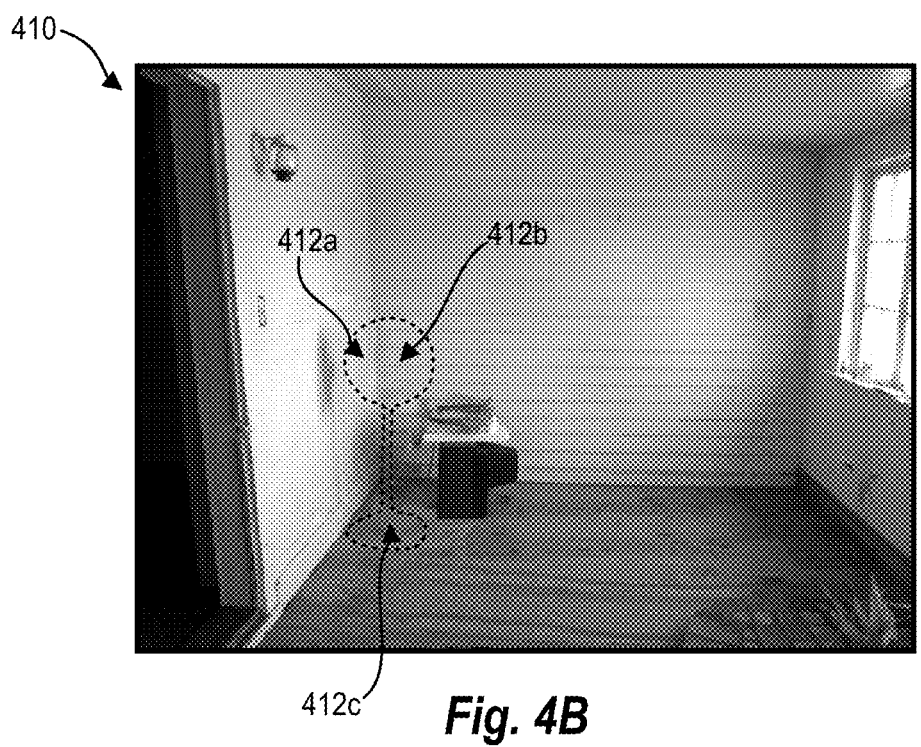
FIG. 4B illustrates an example modified digital image including modifications applied to the digital image of FIG. 4A in accordance with one or more embodiments.

For example, FIG. 4A-4B illustrates another example modification to an input image 402 to generate an output image 410 in which a removed portion of the input image has been replaced. For example, as shown in FIG. 4A, the input image 402 includes a target portion having a first planar portion 408a that overlaps a first background plane 406a, a second planar portion 408b that overlaps a second background plane 406b, and a third planar portion 406c that overlaps a third background plane 408c. Additionally, as shown in FIG. 4A, each of the background planes 406a-c are separated by a separating line 409 that separates the different the background planes 406a-c.

Similar to one or more embodiments described above, the image modification system can identify each background plane 406a-c and planar geometric features 409 separating respective background planes 406a-c. Additionally, upon identifying or receiving a defined target portion 408, the image modification system can target sections 408a-c of the target portion corresponding to each of the background planes 406a-c. Similar to one or more embodiments described above, the image modification system can identify the background planes 406a-c, target sections 408a-c, and separating lines 409 separating the different background planes 406a-c by analyzing the input image 402 and/or an edge map of the input image 402 similar to other edge maps 202, 304 described herein.

The image modification system can remove and replace the first planar portion 408a of the defined target portion with a first replacement portion 412a shown in FIG. 4B. In particular, the image modification system can identify one or more geometric features that intersect with the first planar portion 408a and identify a source portion having geometric properties that correspond with the intersecting geometric features for use in replacing the removed first planar portion 408a. For example, the image modification system can identify the lines caused by the separating lines 409 in addition to lines or other identified geometric features on the left wall of the input image 402. In one or more embodiments, the image modification system aligns the geometric properties of the source portion and further performs any perspective transformation as needed to cause a resulting first replacement portion 412a to blend with the first background plane 406a in the resulting output image 410 as shown in FIG. 4B.

The image modification system can similarly remove and replace the second planar portion 408b of the defined target portion with a second replacement portion 412b shown in FIG. 4B. In particular, the image modification system can identify one or more geometric features that intersect the second planar portion 408b and identify a source portion having geometric properties that correspond with the intersecting geometric features for use in replacing the removed second planar portion 408b. For example, the image modification system can identify separating lines 409 in addition to the horizontal lines on the right wall as shown in the input image 402. In one or more embodiments, the image modification system aligns the geometric properties of the source portion and further performs any perspective transformation as needed to cause a resulting second replacement portion 412b to blend with the second background plane 406b in the resulting output image 410 as shown in FIG. 4B.

The image modification system can similarly remove and replace the third planar portion 408c of the defined target portion with a third replacement portion 412c shown in FIG. 4C. In particular, the image modification system can identify one or more geometric features that intersect the third planar portion 408c and identify a source portion having geometric properties that correspond with the intersecting geometric features for use in replacing the removed third planar portion 408c. For example, the image modification system can identify separating lines 409 running between the floor and walls in addition to lines and other identified patterns that run across the floor of the room depicted in the input image 402. In one or more embodiments, the image modification system aligns the geometric properties of the source portion and further performs any perspective transformation as needed to cause a resulting third replacement portion 412c to blend with the third background plane 406c in the resulting output image 410 as shown in FIG. 4C.

Figure 5:
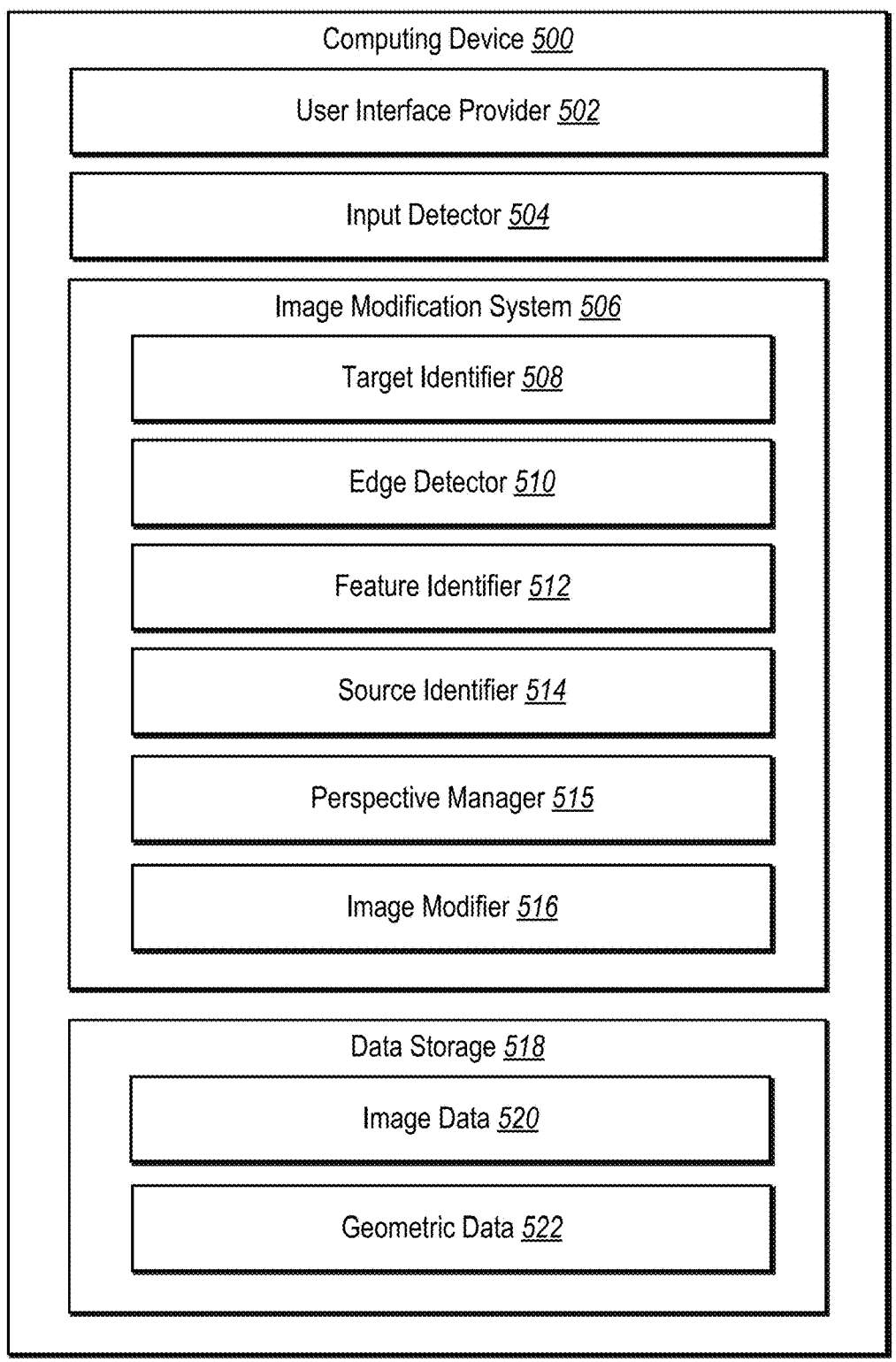
FIG. 5 illustrates a schematic diagram of an example architecture of an image modification system in accordance with one or more embodiments.

FIG. 5 illustrates an architecture of an example image modification system 506. In particular, FIG. 5 illustrates a computing device 500 having a user interface provider 502, input detector 504, and image modification system 506 including a target identifier 508, edge detector 510, feature identifier 512, source identifier 514, perspective manager 515, and image modifier 516. Further, as shown in FIG. 5, the computing device 500 further includes a data storage 518 including image data 520 and geometric data 522.

Each of the components 502-518 of the computing device may be in communication with one another using any suitable communication technologies. In addition, although the components 502-518 are shown separately in FIG. 5, any of the components 502-518 may be combined into fewer components, such as into a single component, or divided into more components as may serve a particular embodiment. In addition, the components 502-518 may be located on, or implemented by, one or more computing devices, such as one or more client devices and/or one or more server devices.

Each of the components 502-518 can comprise software, hardware, or both. For example, each of the components 502-518 can comprise one or more instructions stored on a computer-readable storage medium and one or more processors of one or more computing devices to execute instructions. When executed by the one or more processors, the computer-executable instructions cause the computing device 500 to perform the methods described herein. Alternatively, the components 502-518 can comprise hardware, such as a special purpose processing device to perform a certain function or group of functions.

As shown in FIG. 5, the computing device 500 can include a user interface provider 502. The user interface provider 502 can provide a graphical user interface (or simply "user interface") that allows a user to view, navigate, browse, interact with, or otherwise experience electrical content using the computing device 500. For example, the user interface provider 502 can provide a user interface that include a display of a digital image stored or otherwise accessible to the computing device 500. Likewise, the user interface provider 502 can provide a user interface that facilitates interaction with a displayed digital image. As an example, the user interface provider 502 can provide a display of an input image 102, 302, 402 and one or more defined target portions of the input image 102, 302, 402.

As further illustrated in FIG. 5, the computing device 500 can include an input detector 504. In one or more embodiments, the input detector 504 detects, identifies, and/or receives a user interaction and translates the user interaction into a user input (e.g., a user command or request). As mentioned above, a user input can refer to a single input, or combination of inputs, received from the user by way of one or more input devices.

The input detector 504 can detect a user input from a keyboard, mouse, touch screen, or other input device as part of a communication with the computing device 500. In the event a touch screen is used as an input device, the input detector 504 can detect one or more touch gestures (e.g., swipe gesture, tap gesture) that the user provides via the touch screen. For example, in one or more embodiments, the user provides one or a combination of user inputs selecting an object or target portion to remove from a digital image using a single or multiple touch gestures.

The user interface provider 502 can utilize user input and/or other data received from the input detector 504 to manage, control, and/or facilitate the user of a user interface. In general, in response to the input detector 504 detecting one or more user interactions, the user interface provider 502 provides a user interface that allows the user to view, navigate, browse, interact with, or otherwise experience electronic content using the client device. For instance, as explained herein, in response to receiving a user input defining a target area (e.g., target portion) to remove from within a digital image, the user interface provider 502 can provide a user interface that displays within the digital image a target portion to be removed based on the user input defining the target area.

As mentioned above, and as illustrated in FIG. 5, the computing device 500 further includes an image modification system 506. The image modification system 506 can modify a digital image by removing a target portion of the digital image and generating an output image that includes replacement content in place of the removed target portion. In particular, in response to receiving one or more user inputs with regard to a displayed digital image, the image modification system 506 can facilitate removal of a target portion from the digital image and generate an output image with a replacement portion that blends into the background of the output image.

As shown in FIG. 5, the image modification system 506 includes a target identifier 508. In one or more embodiments, the target identifier 508 identifies an area within a digital image targeted for removal. For example, as described above, the target identifier 508 can receive a selection (e.g., a user selection) of an object within the digital image and identify a portion of the digital image that includes the selected object. Additionally, in one or more embodiments, a user defines a target portion within the digital image by outlining an object or otherwise defining an area of the digital image to remove from the digital image. For example, the user can compose a boundary by drawing a box, circle, or otherwise outlining a portion of the digital image to identify a user-defined target portion to be removed from the digital image.

As shown in FIG. 5, the image modification system 506 further includes an edge detector 510. In one or more embodiments, the edge detector 510 detects edges throughout a digital image. In particular, the edge detector 510 can detect gradients throughout the digital image to identify sharp contrasts throughout the digital image that may be used to identify lines, shapes, objects, or other features (e.g., geometric features) throughout the digital image.

In one or more embodiments, the edge detector 510 generates a representation of the digital image that highlights one or more identified edges or gradients of the digital image. For example, in one or more embodiments, the edge detector 510 generates an edge map that includes a black and white (or other colors) representation of the digital image including white pixels that identify an edge within the digital image and black pixels to identify non-edges within the digital image. In one or more embodiments, the edge detector 510 generates the edge map using a Canny edge detection algorithm for detecting gradient values within the image. The edge detector 510 can utilize additional algorithms and filters to generate an edge map that reliably identifies edges throughout the digital image.

As shown in FIG. 5, the image modification system 506 includes a feature identifier 512. In one or more embodiments, the feature identifier 512 identifies geometric features and properties of a digital image. In particular, the feature identifier 512 can perform one or more transformation algorithms and identify lines, patterns, or other geometric features within the digital image. In one or more embodiments, the feature identifier 512 analyzes the generated edge map to identify lines and other geometric features within the digital image. In this way, the feature identifier 512 can analyze pixels identified as edges within the digital image while ignoring other non-edge pixels and more efficiently computing or otherwise identifying lines and other geometric features within the digital image.

In addition to generally identifying lines and other geometric features, the feature identifier 512 can identify one or more geometric features that intersect or surround the identified target portion of the digital image. For example, where geometric features include horizontal and vertical lines, the feature identifier 512 can identify each horizontal and vertical line that intersects the target portion as well as points that the lines intersect the target portion. Further, in an example where the target portion includes an object to be removed from the digital image, the feature identifier 512 can identify one or more geometric features that presumably pass behind the identifier object to be removed from the digital image.

As shown in FIG. 5, the image modification system 506 includes a source identifier 514. In one or more embodiments, the source identifier 514 identifies source content for replacing a removed target portion from a digital image. For example, as described above, the source identifier 514 can identify a source portion of a digital image for generating a replacement portion and replacing the removed target portion from the digital image. In one or more embodiments, the source identifier 514 identifies source content from the same digital image as the removed target portion. Alternatively, the source identifier 514 can identify source content from one or more different digital images as the digital image including the identified target portion.

In one or more embodiments, the source identifier 514 identifies source content using a probability transformation by identifying pixels within a digital image that may be used as a replacement portion for replacing a removed target portion. For example, the source identifier 514 may evaluate an accumulator of identified lines within a digital image to determine which lines would be useful in replacing a removed target portion. For instance, the source identifier 514 may use a Hough transformation or probability Hough transformation to identify whether a particular line within the accumulator satisfies a particular threshold indicating that a line would be useful in generating a replacement portion to replace the identified target portion. In one or more embodiments, the source identifier 514 identifies the source area by evaluating identified lines of the generated edge map.

As shown in FIG. 5, the image modification system 506 further includes a perspective manager 515. The perspective manager 515 can identify various perspectives within a digital image. For example, the perspective manager 515 can identify different background planes within the digital image. Additionally, the perspective manager 515 can identify different sections of a target portion that correspond to identified background planes. For example, where a target portion overlaps different background planes, the perspective manager 515 can identify respective sections of the target portion that lie on different background planes.

Additionally, the perspective manager 515 can correct perspective differences between an identified source portion and an identified target portion. In particular, where the target portion and source portion overlap different background planes, the perspective manager 515 can generate the replacement portion by modifying a perspective of the identified source portion to have a similar perspective as the background plane surrounding the removed target portion. Additionally, in the case that the target portion overlaps multiple background planes, the perspective manager 515 can correct perspective of a source portion for each section of the removed target portion overlapping each respective background plane.

In one or more embodiments, the perspective manager 515 corrects the perspective different between the source portion and removed target portion by generating a projection matrix for use in generating the replacement portion of an output image. For example, the perspective manager 515 can generate a source matrix representative of the source portion and a target matrix representative of the target portion. The perspective manager 515 can calculate a projection matrix that representing the perspective difference between the source matrix and the target matrix. Using the projection matrix, the perspective manager 515 can generate a replacement portion based on the identified source portion to have a similar perspective as a background plane surrounding the removed target portion.

As shown in FIG. 5, the image modification system 506 further includes an image modifier 516. The image modifier can modify a digital image and generate a modified output image including modifications to the digital image. In particular, the image modifier 516 can remove the identified target portion. Additionally, the image modifier 516 can replace the removed target portion with the generated replacement portion that is aligned, transformed, or otherwise modified to blend into the background of the digital image surrounding the removed target portion. In one or more embodiments, the image modifier 516 filters, aligns, or otherwise modifies the output image to further blend the replacement portion with the surrounding background of the digital image.

As mentioned above, and as shown in FIG. 5, the computing device 500 further includes a data storage 518 including image data 520. In particular, the image data 520 can include any information associated with one or more digital images accessible to the computing device 500. For example, the image data 520 can include data associated with an input image, output image, or other image within a collection of digital images. Additionally, the image data 520 can include information about representations of digital images. For example, in one or more embodiments, the image data 520 can include an edge map or information obtained from an edge map that is representative of a digital image.

In addition, the data storage includes geometric data 522. In particular, the geometric data 522 can include any information associated with identified geometric features or properties of a digital image. For example, geometric data 522 can include identified lines, shapes, patterns, or other identified characteristics of one or more digital images. Additionally, geometric data 522 can include various features or characteristics of digital content that may be used in identifying source portions to be used in generating replacement portions to be used in place of removed target portions. Further, geometric data 522 can include information associated with a perspective of a particular background plane or content within a digital image. Similar to the image data 520, the geometric data can include an edge map or information obtained from an edge map that is representative of a digital image.

Figure 6:
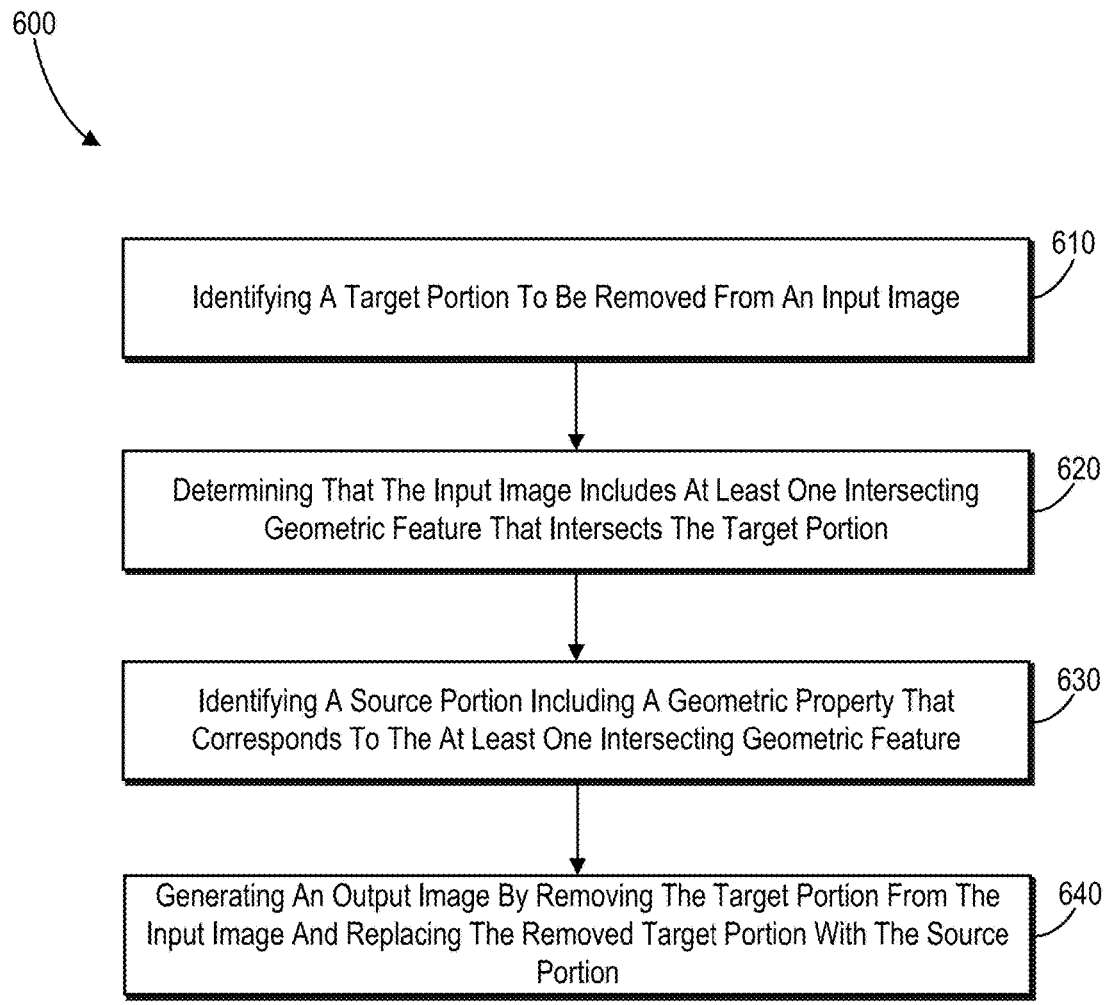
FIG. 6 illustrates a flowchart of a series of acts in a method of modifying a digital image in accordance with one or more embodiments.
Figure 7:
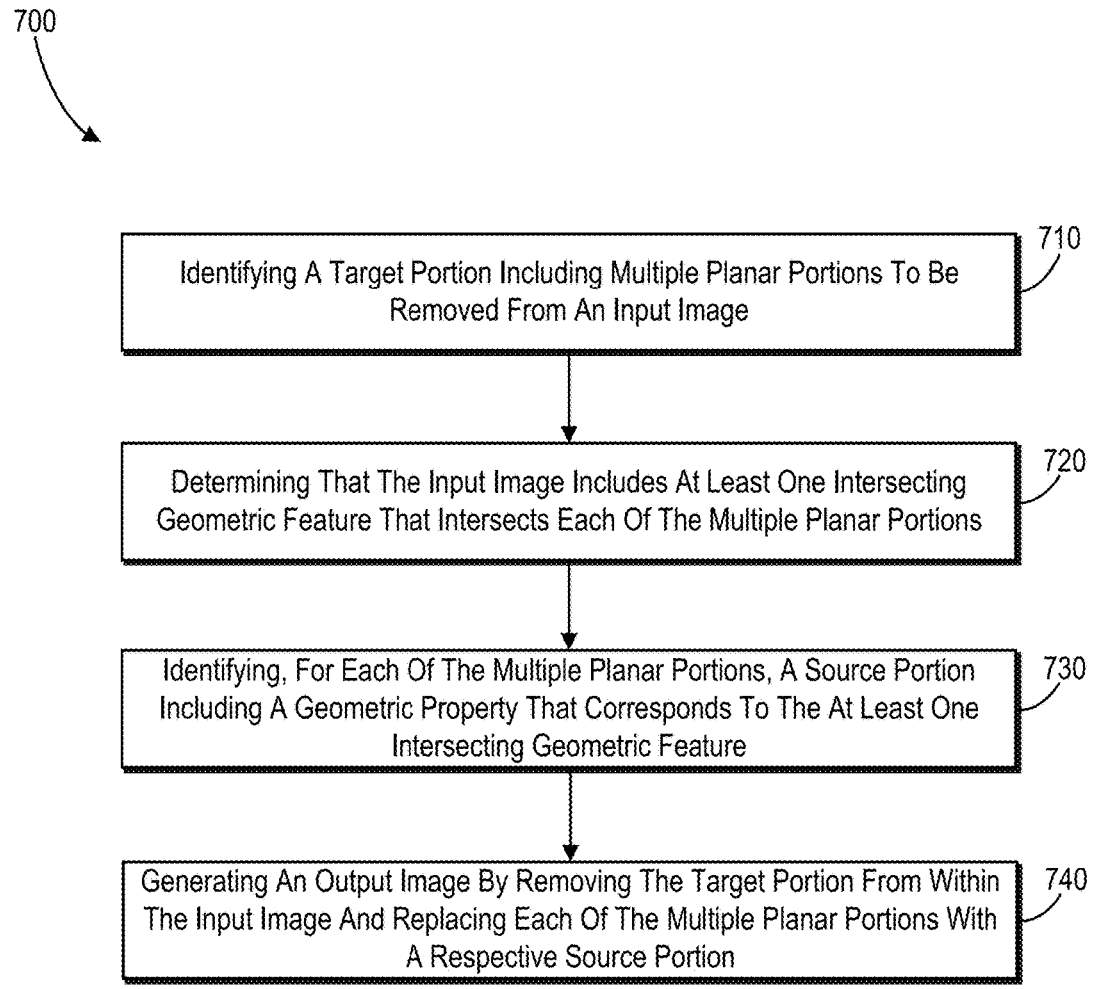
FIG. 7 illustrates another flowchart of a series of acts in a method of modifying a digital image in accordance with one or more embodiments.

FIGS. 1A-5, the corresponding text, and the examples, provide a number of different systems and devices that enable an image modification system 506 to modify a digital image by removing and replacing a target portion from the digital image. In addition to the foregoing, one or more embodiments can also be described in terms of flowcharts comprising acts and steps in a method for accomplishing a particular result. For example, FIGS. 6-7 illustrate flowcharts of exemplary methods in accordance with one or more embodiments. The methods described in relation to FIGS. 6-7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of one example method 600 of modifying a digital image. While FIG. 6 illustrates example steps according to one embodiment, other embodiments may omit, add to, reorder, and/or modify any of the steps shown in FIG. 6. One or more steps shown in FIG. 6 may be performed by any of the components illustrated in computing device 500 illustrated in FIG. 5.

As shown in FIG. 6, the method 600 includes an act 610 of identifying a target portion to be removed from an input image. For example, in one or more embodiments, the act 610 involves identifying, within an input image, a target portion to be removed from the input image. In one or more embodiments, identifying the target portion to be removed from the input image includes receiving a user selection of an object within the input image to be removed from the input image. Alternatively, in one or more embodiments, identifying the target portion to be removed from the input includes receiving a user input defining a boundary of an area within the input image.

As shown in FIG. 6, the method 600 further includes an act 620 of determining that the input image includes at least one intersecting geometric feature that intersects the target portion. For example, in one or more embodiments, the act 620 involves determining, by at least one processor, that the input image includes at least one intersecting geometric feature that intersects the target portion to be removed from the input image. In particular, determining that the input image includes at least one intersecting geometric feature can involve identifying one or more straight lines that intersect or surround the identified target portion. For example, the method 600 can include identifying a plurality of edges within the input image and identifying one or more of the plurality of edges that intersect or surround the target portion to be removed from the input image.

As mentioned above, the method 600 can include identifying a plurality of edges within the input image. In one or more embodiments, identifying the plurality of edges involves generating an edge map that includes a representation of the identified plurality of edges. For example, the representation of the identified plurality of edges may include a binary representation of the input image including white pixels corresponding to identified edges within the input image and black pixels representing non-edges within the input image. In one or more embodiments, identifying the plurality of edges involves performing Canny edge detection to identify gradient values within the input image.

As shown in FIG. 6, the method 600 further includes an act 630 of identifying a source portion including a geometric property that corresponds to the at least one intersecting geometric feature. For example, in one or more embodiments, the act 630 involves identifying, by the at least one processor, a source portion including a geometric property that corresponds to the at least one intersecting geometric feature. In one or more embodiments, identifying the source portion includes identifying source content having similar geometric properties as the at least one intersecting geometric feature that intersects the target portion. In one or more embodiments, identifying the source portion includes identifying source content within the input image having similar geometric properties as the at least one intersecting geometric feature that intersects the target portion. Alternatively, in one or more embodiments, identifying the source portion includes identifying source content from a digital image than the input image having similar geometric properties as the at least one intersecting geometric feature that intersects the target portion.

In one or more embodiments, identifying source content having similar geometric properties as the at least one intersecting geometric feature that intersects the target portion includes identifying a geometric property within the source content. Further, identifying the source content can involve calculating a probability that the identified geometric property corresponds to the at least one intersecting geometric feature. Additionally, identifying the source content can involve determining that the calculated probability exceeds a threshold probability indicating that the identified geometric property will be useful in replacing the at least one intersecting geometric feature.

As shown in FIG. 6, the method 600 further includes an act 640 of generating an output image by removing the target portion from the input image and replacing the removed target portion with the source portion. In one or more embodiments, the method 600 further includes acts to correct different perspectives between the source portion and the target portion. For instance, the method 600 can include determining that the identified source portion lies on a first background plane having a first perspective. Further, the method 600 can include determining that the identified target portion lies on a second background plane having a second perspective. In one or more embodiments, the first perspective has a different perspective than the second perspective.

Upon identifying that the source portion and target portion lie on different background planes, generating the output image may involve generating a transformed source portion by transforming a perspective of the identified source portion. Additionally, generating the output image may involve replacing the removed target portion with the transformed source portion by aligning the geometric property of the transformed source portion with the at least one geometric feature. Further, in one or more embodiments, transforming the perspective of the identified source portion involves generating a source matrix corresponding to the identified source portion, generating a target matrix corresponding to the identified target portion, and generating, based on the source matrix and the target matrix, a projection matrix usable to transform the identified source portion to the perspective of the identified target portion.

As mentioned above, FIG. 7 illustrates a flowchart of an exemplary method 700 of modifying a digital image. In particular, as shown in FIG. 7, the method 700 includes an act 710 of identifying a target portion including planar portions to be removed from an input image. For example, in one or more embodiments, the act 710 involves identifying, from within an input image, a target portion to be removed from the input image where the target portion including a first planar portion corresponding to a first background plane within the input image and a second planar portion corresponding to a second background plane within the input image. Additionally, in one or more embodiments, each of the first background plane and second background plane have different background perspectives.

As shown in FIG. 7, the method 700 further includes an act 720 of determining that the input image comprises at least one intersecting geometric feature that intersects each of the multiple planar portions. For example, in one or more embodiments, the act 720 involves determining, by at least one processor, that the input image includes at least one intersecting geometric feature intersecting each of the first planar portion and the second planar portion. Further, determining that the input image includes at least one intersecting geometric feature intersecting each of the first planar portion and the second planar portion may involve identifying a separating line between the first background plane and the second background plane.

As shown in FIG. 7, the method 700 further includes an act 730 of identifying, for each of the multiple planar portions, a source portion including a geometric property that corresponds to the at least one intersecting geometric feature. For example, in one or more embodiments, the act 730 involves identifying, for each of the first planar portion and the second planar portion, a source portion including a geometric property that corresponds to the at least one interesting geometric feature. In one or more embodiments, identifying the source portion includes identifying a first source portion corresponding to the first planar portion where the first source portion includes source content from the input image. Additionally, in one or more embodiments, identifying the source portion includes identifying a second source portion corresponding to the second planar portion where the second source portion includes source content from another digital image other than the input image. Thus, the source portion may include digital content from one or multiple different digital images.

Further, as shown in FIG. 7, the method 700 further includes an act 740 of generating an output image by removing the target portion from the input image and replacing each of the multiple planar portions with a respective source portion. For example, in one or more embodiments, the act 740 involves generating, by the at least one processor, an output image by removing the target portion from within the input image and replacing each of the first planar portion and the second planar portion of the output image with the identified source portion for each of the first planar portion and the second planar portion of the input image. In one or more embodiments, the method 700 includes corrective for perspective differences between different source portions and respective target portions. For example, the method 700 can include transforming one or more of the first source portion and the second source portion to correspond to a particular background perspective. Additionally, generating the output image may involve aligning identified geometric features intersecting the target portions with corresponding geometric properties of the respective source portions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 8:
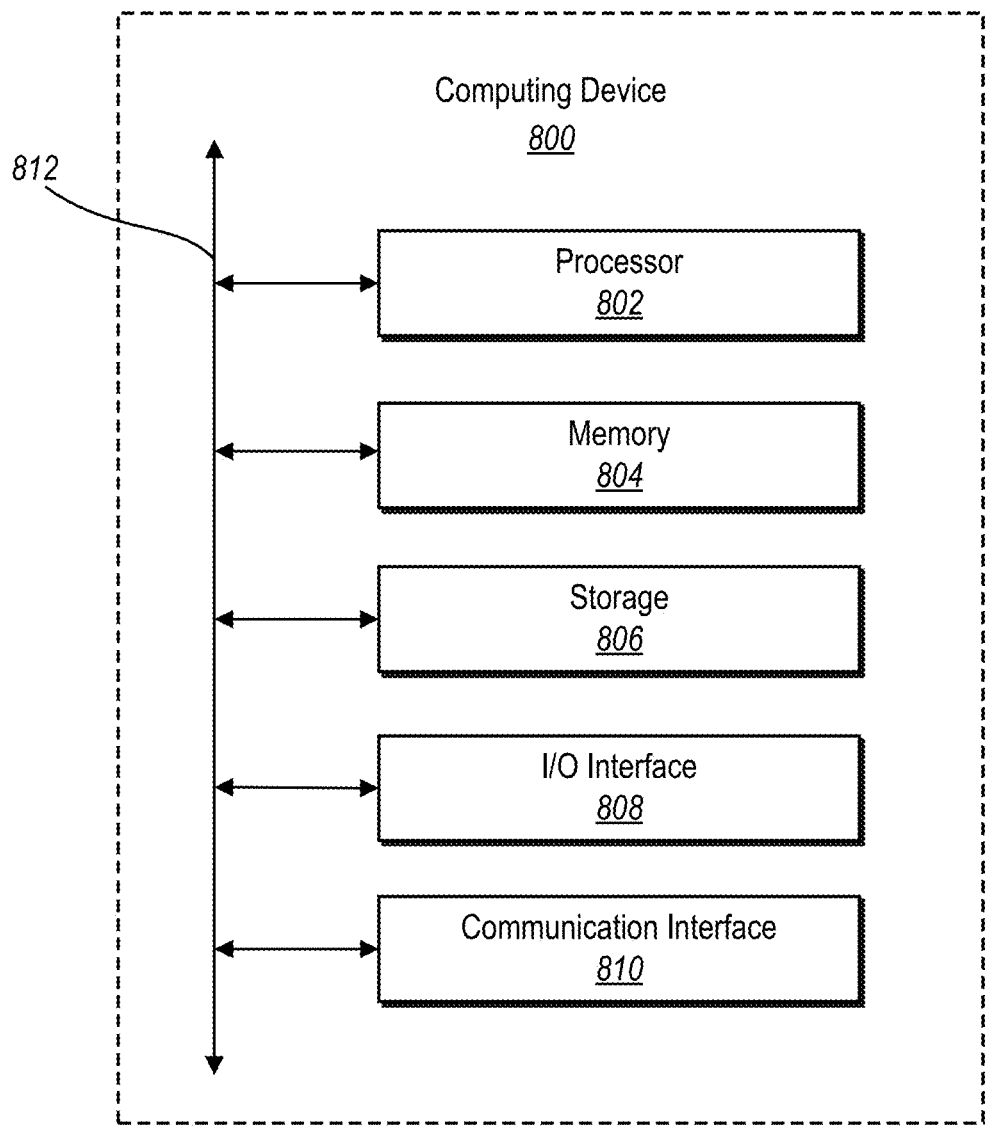
FIG. 8 illustrates a block diagram of a computing device in accordance with one or more embodiments.

FIG. 8 illustrates a block diagram of exemplary computing device 800 that may be configured to perform one or more of the processes described above. One will appreciate that computing device 500 may be implemented by one or more computing devices such as computing device 800. As shown by FIG. 8, computing device 800 can comprise processor 802, memory 804, storage device 806, I/O interface 808, and communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method for modifying a digital image by removing and filling portions of the digital image, comprising:
    identifying, within an input image, an object to be removed from the input image, the object defined by an object boundary;
    detecting a background plane having a first perspective surrounding at least a portion of the object;
    determining, by at least one processor, that the background plane comprises a first plurality of lines that intersect the object boundary of the object to be removed from the input image;
    identifying, by the at least one processor, a source portion on a source plane having a second perspective comprising a second plurality of lines that correspond to the first plurality of lines of the background plane, wherein the second perspective is different than the first perspective;
    modifying the source portion by transforming the second perspective associated with the source portion to correspond to the first perspective of the background plane; and
    generating, by the at least one processor, an output image by removing the object from the input image and replacing the removed object with the modified source portion by aligning the second plurality of lines of the modified source portion with the first plurality of lines of the background plane.

2. The method as recited in claim 1, wherein identifying the object to be removed from the input image comprises receiving a user selection of the object positioned on the background plane within the input image.

3. The method as recited in claim 1, wherein identifying the object to be removed from the input image comprises receiving a user input defining the object boundary of the object within the input image.

4. The method as recited in claim 1, further comprising:
    identifying a plurality of edges within the input image; and
    wherein determining that the background plane comprises the first plurality of lines that intersect the object boundary of the object to be removed from the input image comprises identifying one or more of the identified plurality of edges that intersect the object boundary of the object to be removed from the input image.

5. The method as recited in claim 4, wherein identifying the plurality of edges within the input image comprises generating an edge map comprising a representation of the identified plurality of edges.

6. The method as recited in claim 5, wherein generating the edge map comprises generating a binary representation of the input image, the binary representation comprising white pixels corresponding to identified edges within the input image and black pixels representing non-edges within the input image.

7. The method as recited in claim 4, wherein identifying the plurality of edges within the input image comprises performing Canny edge detection to identify gradient values within the input image.

8. The method as recited in claim 1, wherein modifying the source portion by transforming the second perspective associated with the source portion to correspond to the first perspective of the background plane comprises calculating a projection matrix.

9. The method as recited in claim 8, wherein modifying the source portion by transforming the second perspective associated with the source portion to correspond to the first perspective of the background plane further comprises multiplying the source portion by the projection matrix.

10. The method as recited in claim 8, wherein identifying the source portion comprises identifying source content from a different background plane within a different digital image than the background plane of the input image having a plurality of lines corresponding to the first plurality of lines of the background plane that intersect the object boundary of the object to be removed from the input image.

11. The method as recited in claim 8, wherein identifying the source portion comprises:
   calculating a probability that the second plurality of lines correspond to the first plurality of lines that intersect the object boundary of the object to be removed from the input image; and
   determining that the probability exceeds a threshold probability indicating that the source portion will be useful in replacing the object to be removed from the input image.

12. The method as recited in claim 1, wherein generating the output image further comprises:
   generating a transformed source portion by transforming the second perspective of the identified source portion; and
   replacing the object with the transformed source portion by aligning the second plurality of lines of the transformed source portion with the first plurality of lines intersecting the object boundary.

13. The method as recited in claim 12, wherein transforming the second perspective of the identified source portion comprises:
   generating a source matrix corresponding to the identified source portion;
   generating a target matrix corresponding to the identified object to be removed from the input image; and
   generating, based on the source matrix and the target matrix, a projection matrix usable to transform the identified source portion to the perspective of the object to be removed from the input image.

14. A computing system comprising:
   at least one processor; and
   a non-transitory computer-readable medium storing instructions thereon that, when executed by the at least one processor, cause the computing system to:
   identify, within an input image, an object to be removed from the input image, the object defined by an object boundary;
   detect a background plane having a first perspective surrounding at least a portion of the object;
   determine that the background plane comprises a first plurality of lines that intersect the object boundary of the object to be removed from the input image;
   identify a source portion on a source plane having a second perspective within the input image comprising a second plurality of lines that correspond to the first plurality of lines of the background plane, wherein the second perspective is different than the first perspective;
   modifying the source portion by transforming the second perspective associated with the source portion to correspond to the first perspective of the background plane; and
   generate an output image by removing the object from the input image and replacing the removed object with the modified source portion by aligning the second plurality of lines of the modified source portion with the first plurality of lines of the background plane.

15. The computing system as recited in claim 14, wherein the instructions further cause the computing system to:
   generate an edge map comprising a representation of identified edges within the input image; and
   identify, within the edge map, the first plurality of lines from the identified edges within the input image.

16. The method of claim 1, further comprising:
   identifying an intersecting line intersecting the object to be removed from the input image, the intersecting line defining a first region of the object corresponding to the background plane and a second region of the object corresponding to a second background plane; and
   wherein identifying the source portion comprises:
      identifying a first source portion comprising the second plurality of lines that correspond to the first plurality of lines of the background plane to replace the first region of the object; and
      identifying a second source portion corresponding to the second background plane to replace the second region of the object.

17. The method of claim 16, wherein generating the output image comprises:
   replacing the first region of the object with the first source portion by aligning second plurality of lines of the source portion with the first plurality of lines of the background plane; and
   replacing the second region of the object with the second source portion corresponding to the second background plane.

18. The computing system of claim 14, wherein the instructions cause the computing device to:
   identify an intersecting line intersecting the object to be removed from the input image, the intersecting line defining a first region of the object corresponding to the background plane and a second region of the object corresponding to a second background plane; and
   wherein identifying the source portion comprises:
      identifying a first source portion comprising the second plurality of lines that correspond to the first plurality of lines of the background plane to replace the first region of the object; and
      identifying a second source portion corresponding to the second background plane to replace the second region of the object.

19. The computing system of claim 18, wherein generating the output image comprises:
   replacing the first region of the object with the first source portion by aligning second plurality of lines of the source portion with the first plurality of lines of the background plane; and
   replacing the second region of the object with the second source portion corresponding to the second background plane.

20. A non-transitory computer readable medium comprising instructions that, when executed by at least one processor, cause a computing device to:
   identify, within an input image, an object to be removed from the input image, the object defined by an object boundary;
   detect a background plane having a first perspective surrounding at least a portion of the object;
   determine that the background plane comprises a first plurality of lines that intersect the object boundary of the object to be removed from the input image;
   identify a source portion on a source plane having a second perspective within the input image comprising a second plurality of lines that correspond to the first plurality of lines of the background plane, wherein the second perspective is different than the first perspective;

modifying the source portion by transforming the second perspective associated with the source portion to correspond to the first perspective of the background plane; and generate an output image by removing the object from the input image and replacing the removed object with the modified source portion by aligning the second plurality of lines of the modified source portion with the first plurality of lines of the background plane.

\* \* \* \* \*